US008876638B2

(12) United States Patent
Paul et al.

(10) Patent No.: US 8,876,638 B2
(45) Date of Patent: Nov. 4, 2014

(54) REAL TIME PITCH CLASSIFICATION

(75) Inventors: Ross Paul, Brooklyn, NY (US); Cory Schwartz, Merrick, NY (US)

(73) Assignee: MLB Advanced Media, L.P., New York, NY (US)

(*) Notice: Subject to any disclaimer, the term of this patent is extended or adjusted under 35 U.S.C. 154(b) by 208 days.

(21) Appl. No.: 12/696,577

(22) Filed: Jan. 29, 2010

(65) Prior Publication Data

US 2011/0190912 A1 Aug. 4, 2011

(51) Int. Cl.

| | |
|---|---|
| ***A63B 69/00*** | (2006.01) |
| ***A63F 7/07*** | (2006.01) |
| ***A63F 7/20*** | (2006.01) |
| ***A63B 67/14*** | (2006.01) |
| ***G06F 19/00*** | (2011.01) |

(52) U.S. Cl.

CPC .................................... *G06F 19/00* (2013.01)
USPC .................... 473/451; 273/108.3; 273/317.6; 463/3

(58) Field of Classification Search

USPC ............ 463/3; 473/451, 454, 456; 273/108.3, 273/108.31, 317.6, 317.7; 382/181; 700/91-93
See application file for complete search history.

(56) References Cited

U.S. PATENT DOCUMENTS 4,545,576 A * 10/1985 Harris .......................... 473/468
4,563,005 A * 1/1986 Hand et al. .................... 473/455
5,230,505 A * 7/1993 Paquet et al. ................ 473/455
5,333,855 A * 8/1994 Silin et al. .................... 473/455
5,479,008 A * 12/1995 Nishiyama et al. ........ 250/222.1
5,509,649 A * 4/1996 Buhrkuhl ...................... 473/455
5,553,846 A * 9/1996 Frye et al. ..................... 473/455
5,566,934 A * 10/1996 Black et al. .................. 473/431
5,779,241 A * 7/1998 D'Costa et al. ............... 273/371
5,820,496 A * 10/1998 Bergeron ...................... 473/455
6,394,895 B1 * 5/2002 Mino ................................ 463/3
6,719,628 B2 * 4/2004 Okishio et al. .................... 463/3
7,341,530 B2 * 3/2008 Cavallaro et al. ............ 473/455
7,367,906 B2 * 5/2008 Tien ............................. 473/451
7,946,960 B2 * 5/2011 Vitolo et al. ...................... 482/8
7,956,893 B2 * 6/2011 Lee et al. ...................... 348/169
8,531,462 B1 * 9/2013 Tillman et al. ............... 345/473
2002/0081002 A1 * 6/2002 Lee et al. ...................... 382/107
2002/0126318 A1 * 9/2002 Katayama ..................... 358/402
2003/0051718 A1 * 3/2003 Battersby et al. ............... 124/78
2004/0235565 A1 * 11/2004 Shiozawa ......................... 463/32
2005/0153764 A1 * 7/2005 Sterchi et al. ..................... 463/3

(Continued)

FOREIGN PATENT DOCUMENTS

JP 2008284166 A * 11/2008

OTHER PUBLICATIONS

MLB Advanced Media L.P. News Release, New York, NY, 1 sheet, 2008.

*Primary Examiner* — Milap Shah
(74) *Attorney, Agent, or Firm* — Foley & Lardner LLP

(57) ABSTRACT

A method for performing pitch classification includes receiving, at a computing device, one or more pitch properties corresponding to a ball thrown by a pitcher. Pitcher information corresponding to the pitcher is also received. The pitcher information includes at least an identification of one or more pitches that are in a repertoire of the pitcher. A classification of the pitch is determined using at least a pitch classification algorithm, where the classification of the pitch is based at least in part on the one or more pitch properties and at least in part on the pitcher information.

17 Claims, 4 Drawing Sheets

(56) References Cited

U.S. PATENT DOCUMENTS

2005/0187036 A1* 8/2005 Ziola et al. .................... 473/372
2006/0035731 A1* 2/2006 Husband ....................... 473/422
2008/0086223 A1* 4/2008 Pagliarulo ...................... 700/91
2008/0103997 A1* 5/2008 Fein et al. ...................... 706/12
2008/0188353 A1* 8/2008 Vitolo et al. ..................... 482/8
2008/0293464 A1* 11/2008 Cheng et al. ..................... 463/3
2009/0093300 A1* 4/2009 Lutnick et al. .................. 463/26
2009/0149974 A1* 6/2009 Storch et al. .................... 700/91
2009/0182691 A1* 7/2009 Khaderi .......................... 706/12
2009/0257649 A1* 10/2009 Yamauchi et al. ............ 382/165
2010/0041498 A1* 2/2010 Adams .......................... 473/451
2010/0081524 A1* 4/2010 Husband ....................... 473/451
2011/0250936 A1* 10/2011 Christenson ...................... 463/3
2012/0033855 A1* 2/2012 Ryan ............................ 382/103

* cited by examiner

REAL TIME PITCH CLASSIFICATION

BACKGROUND

In baseball, there are many different types of pitches that a pitcher can deliver. For example, the pitcher can throw a fastball, a breaking ball, a changeup ball, a knuckleball, an eephus pitch, a spitball, a gyro ball, etc. In addition, each pitch category may include variations of the pitch. For example, a fastball may be characterized as a four-seam fastball, a two-seam fastball, a cutter, a forkball, a splitter, a sinker, etc. Opponents can use pitch classification information to help prepare batters to go up against a given pitcher. Scouts can use pitch classification information to help determine whether a given pitcher is able to throw pitches that other pitchers on the roster are unable to deliver. Also, fans and the media can use pitch classification information for pitcher comparisons, statistical analysis, etc.

Traditional pitch classification is often performed manually by way of post game analysis to review and classify pitches made during the game. More recently, an automated pitch classification system has been developed in which information such as pitch speed or velocity, pitch trajectory, and pitch movement are obtained for a given pitch. The information for the given pitch is analyzed by a computer system, and a pitch classification is generated. Such automated pitch classification system, however, utilizes only a limited amount of pitch information, and thus is limited in its ability to classify pitches accurately and rapidly.

Accordingly, it would be advantageous to provide an automated system that utilizes additional information to classify pitches more accurately and reliably than pre-existing systems. It would also be advantageous to provide a real time automated pitch classification system that utilizes error correction and that is configured to classify any type of pitch thrown by any pitcher.

SUMMARY

An illustrative method for performing pitch classification includes receiving, at a computing device, one or more pitch properties corresponding to a ball thrown by a pitcher. Pitcher information corresponding to the pitcher is also received. The pitcher information includes at least an identification of one or more pitches that are in a repertoire of the pitcher. A classification of the pitch is determined using at least a pitch classification algorithm, where the classification of the pitch is based at least in part on the one or more pitch properties and at least in part on the pitcher information.

An illustrative computing device includes a memory configured to store a pitch classification algorithm and a processor operatively coupled to the memory. The processor is configured to provide one or more pitch properties corresponding to a ball thrown by a pitcher to the pitch classification algorithm. The processor is also configured to provide pitcher information to the pitch classification algorithm, where the pitcher information includes at least an identification of one or more pitches that are in a repertoire of the pitcher. The processor is further configured to determine, based at least in part on the one or more pitch properties and at least in part on the pitcher information, a classification of the pitch using at least the pitch classification algorithm.

An illustrative computer-readable medium has stored thereon, computer-executable instructions that, if executed by a computing device, cause the computing device to perform a method. The method includes receiving one or more pitch properties corresponding to a ball thrown by a pitcher. Pitcher information corresponding to the pitcher is also received. The pitcher information includes at least an identification of one or more pitches that are in a repertoire of the pitcher. A classification of the pitch is determined based at least in part on the one or more pitch properties and at least in part on the pitcher information.

Other principal features and advantages will become apparent to those skilled in the art upon review of the following drawings, the detailed description, and the appended claims.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
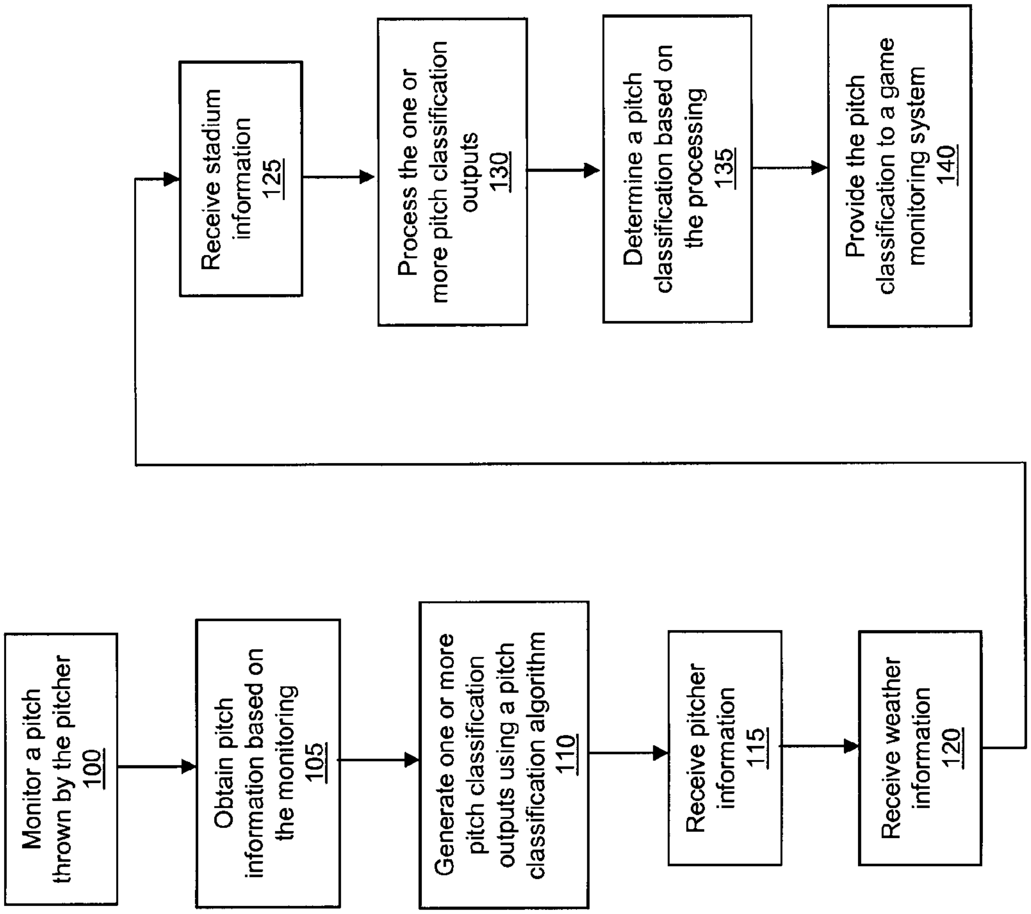
FIG. 1 is a flow diagram illustrating a process for implementing real time pitch classification in accordance with an illustrative embodiment.

In the following detailed description, reference is made to the accompanying drawings, which form a part hereof. In the drawings, similar symbols typically identify similar components, unless context dictates otherwise. The representative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 is a flow diagram illustrating a process for implementing real time pitch classification in accordance with an illustrative embodiment. In alternative embodiments, fewer, additional, and/or different operations may be performed. In one embodiment, the operations described with reference to FIG. 1 can be implemented by a pitch classification system. The pitch classification system can perform real time analysis on pitches thrown during a game such that the pitches can be classified for use in a play-by-play game tracking system. The pitch classification can also be used by commentators, in statistical algorithms, etc. An illustrative pitch classification system is described in more detail with reference to FIG. 4.

In an operation 100, a pitch thrown by the pitcher is monitored. The monitoring can be performed by one or more video cameras, by one or more speed sensors, one or more acceleration sensors, one or more elevation sensors, one or more radar sensors, etc. In an operation 105, pitch information (or pitch properties) is obtained based on the monitoring. In an illustrative embodiment, the pitch information can be obtained by using one or more algorithms to analyze video of the pitch. The pitch information can also be obtained based on sensor readings, based on analysis of the sensor readings, based on calculations performed on monitored data, etc. Alternatively, the pitch information may be received as information provided from an external source that is monitoring the pitch. The pitch information can also be calculated based on information obtained through monitoring of the pitch such as pitch velocity, pitch trajectory, pitch movement, spin, acceleration, etc.

Figure 2:
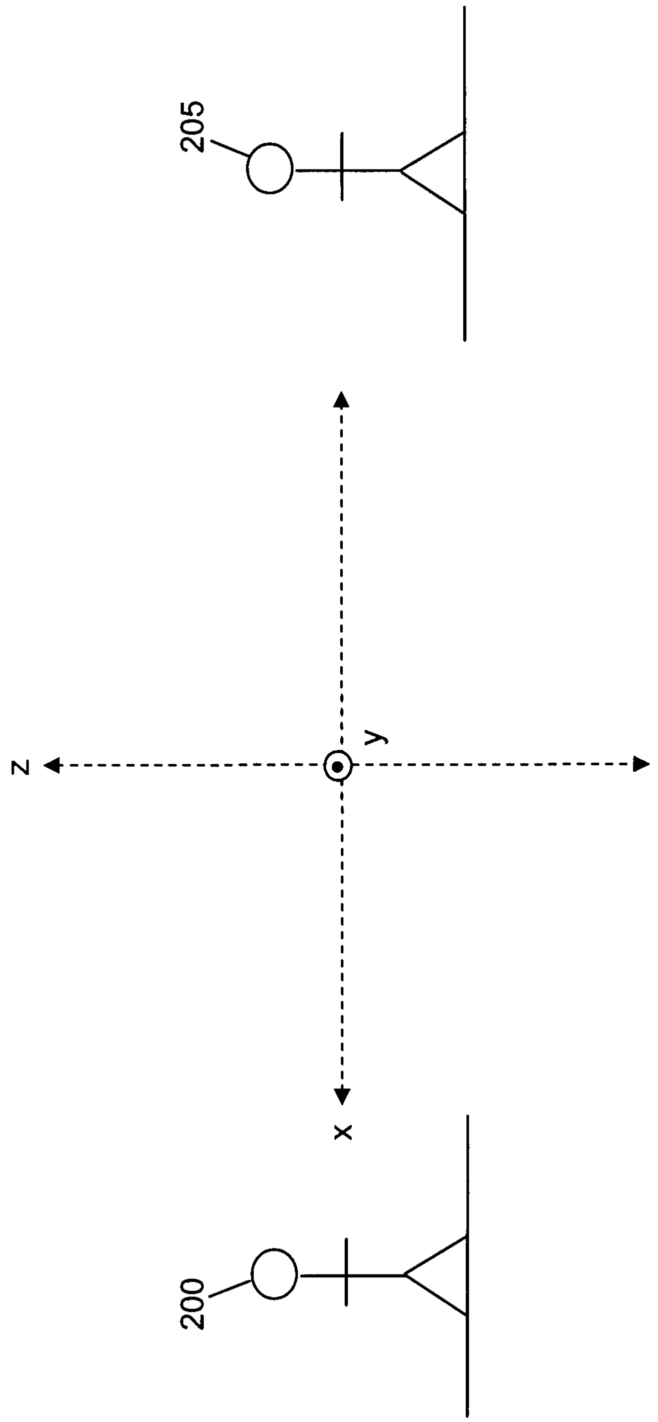
FIG. 2 is a block diagram illustrating a coordinate system in accordance with an illustrative embodiment.

In the exemplary embodiment, the pitch information (or pitch properties) includes an initial (or release) speed of the pitch, an end speed of the pitch, a maximum speed of the pitch, a minimum speed of the pitch, an average speed of the pitch, etc. The pitch information can also include an initial (or release) direction of the pitch, a terminal direction of the pitch, etc. The directions associated with the pitch are referenced to the x direction, the y direction, and/or the z direction. FIG. 2 is a block diagram illustrating a coordinate system in accordance with an illustrative embodiment. As indicated in FIG. 2, the x direction can be defined by an axis that runs directly between a pitcher 200 and a batter 205 (or between pitcher 200 and the home plate, or between pitcher 200 and the catcher, etc.). The z direction (or vertical direction) can be defined by an axis that extends vertically and that corresponds to an elevation of the ball. The y direction can be defined by an axis that corresponds to side-to-side or horizontal movement of the ball. As illustrated in FIG. 2, the axis in the y direction comes out of (and goes into) the page at a ninety degree angle. The axes corresponding the to the x, y, and z directions can all intersect one another at ninety degree angles.

Referring again to FIG. 1, the pitch properties can also include a ball movement value. The ball movement value refers to a distance between an end point of the actual pitch and an end point of a theoretical pitch, where the theoretical pitch corresponds to a trajectory (or path) that the ball would take if the pitch were thrown in a vacuum (i.e., the trajectory of the ball if spin/rotation of the ball did not affect the trajectory). The pitch properties (or pitch information) can also include a distance that the pitch breaks (i.e., breaking distance) and/or a direction that the pitch breaks. The break of a pitch refers to a maximum distance between a trajectory of the ball and a straight line that connects a starting point of the ball and an ending point of the ball. In an illustrative embodiment, the breaking distance is calculated based at least in part on the ball movement value, the velocity, and/or the trajectory of the pitch. The pitch properties can further include an initial acceleration of the ball, an ending acceleration of the ball, an average acceleration of the ball, a maximum acceleration of the ball, a minimum acceleration of the ball, a direction of acceleration of the ball, an amount of spin on the ball (in revolutions per minute, etc.), a direction of the spin on the ball, a number of rotations of the ball, etc.

In an operation 110, one or more pitch classification outputs are generated using a pitch classification algorithm. In an illustrative embodiment, the pitch classification algorithm can be an artificial neural network algorithm as known to those of skill in the art. In another illustrative embodiment, the neural network algorithm can be implemented as computer code instructions configured to be executed by a computing device, and can be stored on a computer-readable medium. For descriptive and illustrative purposes, the neural network algorithm can be thought of as an interconnection of nodes that are grouped into different layers. For example, the neural network algorithm can include a plurality of processing layers, each of which can be represented as having a plurality of nodes. The nodes in each of the layers applies activation functions to received data to generate outputs. The outputs are weighted and provided to one or more nodes in a subsequent layer of the neural network, and the process continues until the pitch classification outputs are generated. The activation functions and/or the weights used by the neural network algorithm can be determined by training the neural network based on established data.

As an example, nodes of a first layer of the neural network are input nodes. Each of the input nodes are configured to receive at least one input, and apply an activation function to the at least one input. In an illustrative embodiment, the inputs to the neural network include any or all of the pitch information. The output from the input nodes are weighted and provided to one or more nodes in a subsequent layer of the neural network for further processing, and so on until the pitch classification outputs are generated. The pitch classification outputs each represent a likelihood that the pitch information (i.e., the inputs) corresponds to a particular type of pitch. For example, a first pitch classification output can represent the likelihood that the pitch was a knuckleball, a second pitch classification output can represent the likelihood that the pitch was a two-seam fastball, and so on. In an alternative embodiment, a single pitch classification output that classifies the pitch may be provided by the pitch classification algorithm. An illustrative neural network algorithm is described in more detail with reference to FIG. 3. In alternative embodiments, the pitch classification algorithm may be implemented as a decision tree algorithm, a K-nearest neighbor algorithm, and/or any other type of algorithm known to those of skill in the art.

The pitch classification algorithm can be configured to classify any type of pitch known to those of skill in the art. For example, the pitch may be classified as a fastball, as a four-seam fastball, as a two-seam fastball, as a cutter (or cut fastball), as a forkball, as a splitter, as a sinker, as a breaking ball, as a curve ball, as a slider, as a screw ball, as a changeup ball, as a palm ball, as a circle change, as a super changeup, as a knuckleball, as an eephus pitch, as a spitball, as a gyro ball, as a shuuto, etc. In an illustrative embodiment, the pitch is classified from the perspective of the batter (i.e., the pitch classification algorithm classifies the pitch based on how a typical batter receiving the pitch would classify it). Alternatively, and as described in more detail below, the pitch may be classified based at least in part on how the pitcher would classify the pitch.

In an operation 115, pitcher information is received. In an illustrative embodiment, the pitcher information is retrieved from a database, memory, server, or other source. The pitcher information can also be manually entered into a computer system that executes or is otherwise associated with the pitch classification algorithm. The pitcher information includes an identification of a pitcher whose pitch is to be classified, where the identification can be a name, an identification number, etc. The pitcher information can also include an indication of whether the pitcher is right-handed or left-handed, a maximum pitch speed of the pitcher, a minimum pitch speed of the pitcher, a speed range of the pitcher, an average pitch speed of the pitcher, a repertoire of pitches commonly thrown by the pitcher, a favorite pitch of the pitcher, an identification of pitches that are never thrown by the pitcher, information regarding how the pitcher classifies his/her pitches, etc.

In an operation 120, weather information is received. The weather information can be received from one or more weather sensors. The weather information can also be manually inputted into the computer system and/or retrieved from a database, server, memory, or other source. The weather information includes weather conditions that may affect the pitch such as one or more of wind speed, wind direction, temperature, humidity, amount of sunlight, time of day, etc. In an operation 125, stadium information is received. As with the pitcher information and the weather information, the stadium information can be manually inputted into the computer system and/or retrieved from a database, server, memory, or other source. The stadium information can include an identification of the ballpark, whether the pitcher is playing in a home game or an away game, whether a roof of the stadium is open or closed, etc. In one embodiment, the stadium information can also include game scenario information such as a current inning, a number of runners on base, a count (i.e., a number of strikes and balls that a current batter has), a number of pitches that the pitcher has already thrown in the game, etc.

In an operation 130, the one or more pitch classification outputs are processed based on one or more of the pitcher information, the weather information, and the stadium information. Processing the one or more pitch classification outputs can include weighting or biasing the pitch classification outputs based on the additional information. For example, if the pitcher information indicates that the pitcher generally only throws four types of pitches, the pitch classification outputs corresponding to those four pitches can be weighted to increase the likelihood that the pitch will be classified as one of the four pitches. Also, if the pitcher information indicates that the pitcher never throws a particular type of pitch, the pitch classification output corresponding to that pitch can be eliminated, or weighted to reduce the likelihood that the pitch will be classified as that particular type of pitch. Similarly, the one or more pitch classification outputs can weighted (positively or negatively) or eliminated based on the identification of the pitcher, whether the pitcher is right-handed or left-handed, a maximum pitch speed of the pitcher, a minimum pitch speed of the pitcher, an average pitch speed of the pitcher, a speed range of the pitcher, a favorite pitch of the pitcher, the wind speed, the wind direction, the temperature, the humidity, the amount of sunlight, the time of day, the identification of the ballpark, whether the pitcher is playing in a home game or an away game, whether a roof of the stadium is open or closed, the current inning, the number of runners on base, the count facing the batter, the number of pitches that the pitcher has already thrown in the game, etc.

In an operation 135, a pitch classification is determined based on the processing. As indicated above, each of the pitch classification outputs can correspond to a particular type of pitch. Each of the pitch classification outputs can also be a numerical value from 0-1, from 0-10, from 0.1-0.9, etc. that represents a likelihood that the pitch was the particular type of pitch type corresponding to the output. As such, after processing, the pitch can be classified as the particular type of pitch that corresponds to the pitch classification output with the highest (or lowest, depending on the embodiment) value. The highest value of the pitch classification output can also be used as a confidence value to indicate how confident the system is that the pitch corresponds to the pitch type associated with the pitch classification output. In alternative embodiments, the pitch classification outputs may be any other values and/or any other methods may be used to determine the classification of the pitch based on the pitch classification outputs.

As indicated above, the pitch type corresponding to the pitch classification output with the highest, lowest, etc. value can be used as the ultimate classification of the pitch. In an alternative embodiment, the system may classify the pitch based at least in part on how the specific pitcher that threw pitch would classify it. As an example, the result of the pitch classification algorithm and any post-processing may indicate that the pitch is a 2-seam fastball. However, the pitcher information may include information indicating that, based on the pitch information, the pitcher would classify the pitch as a sinker. As such, the system may classify the pitch as a sinker as opposed to a 2-seam fastball. As a result, the exact same pitch thrown by two different pitchers may be classified differently. In an alternative embodiment, how the pitcher would classify the pitch may not be considered.

In another alternative embodiment, the pitch classification outputs may not be further processed by the computer system as described with reference to operation 130. In such an embodiment, any or all of the pitcher information, the weather information, and/or the stadium information may serve as inputs to the pitch classification algorithm. As such, the one or more pitch classification outputs can be based on the pitcher information, the weather information, and/or the stadium information, and post-processing can be eliminated.

In an operation 140, the pitch classification is provided to a game monitoring system. In an illustrative embodiment, the game monitoring system is a network-based server that provides play-by-play coverage of the game through a website. As such, in addition to other information such as the score, the inning, the number of outs, runner positions on the bases, player statistics, etc., the game monitoring system can also provide a classification of the pitch right after the pitch is delivered. The game monitoring system can also include a memory, a database, or other information repository that is accessible by broadcasters that are announcing the game and/or the general public. The game monitoring system can further include one or more statistical algorithms that are configured to keep track of and analyze pitch classifications. The pitch classification can be provided along with any other information regarding the pitcher (i.e., the name of the pitcher), the game (i.e., whether the pitch resulted in a hit, a strike, a ball, or a foul ball), etc. In one embodiment, the pitch classification and any other information may be sent directly to a personal computer, a personal digital assistant, a cellular phone, etc. of a subscriber to a service that provides game coverage.

Figure 3:
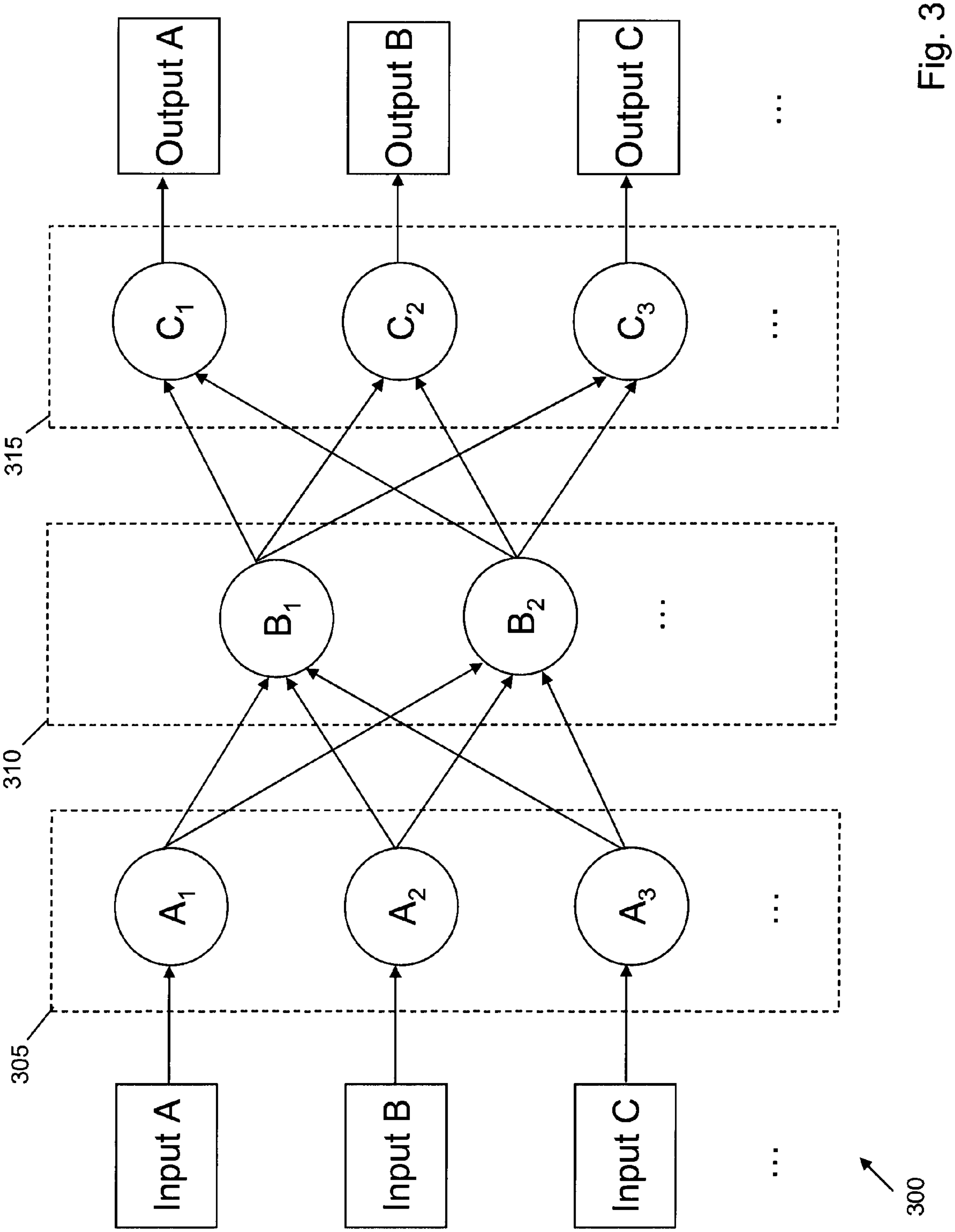
FIG. 3 is a block diagram illustrating a neural network in accordance with an illustrative embodiment.

FIG. 3 is a block diagram illustrating a neural network 300 in accordance with an illustrative embodiment. Neural network 300 can be used as the pitch classification algorithm described with reference to FIG. 1. In an illustrative embodiment, neural network 300 can implemented as computer code instructions to be executed by a computing device, and can be stored on a computer-readable medium. The description of neural network 300 provided with reference to FIG. 3 is for illustrative purposes only, and is not meant to be limiting with respect to the actual implementation. In an alternative embodiment, any other type of algorithm, computer code, computer program, logic, etc. may be used as the pitch classification algorithm.

Neural network 300 includes an input layer 305, a hidden layer 310, and an output layer 315. In alternative embodiments, neural network 300 may include fewer or additional layers. For example, in an illustrative embodiment, neural network 300 may include two hidden layers. Input layer 305 includes a node $A_1$ configured to receive an input A, a node $A_2$ configured to receive an input B, and a node $A_3$ configured to receive an input C. In alternative embodiments, fewer or additional nodes and/or inputs may be used. Inputs A, B, and C can be any of the pitch information (or pitch properties), the pitcher information, the weather information, or the stadium information described with reference to FIG. 1. As an example, input A can be a ball movement value or a calculated breaking distance of the pitch, input B can be a maximum speed of the pitch, input C can be an acceleration of the pitch, an input D (not shown) can be an amount of ball spin, an input E (not shown) can be a breaking distance of the pitch, an input F (not shown) can be a release direction of the pitch, etc.

The inputs can also be calculated values based on one or more of the pitch information, the pitcher information, the weather information, the stadium information, etc. For example, one input may be a normalized representation of the maximum pitch speed based on the actual maximum pitch speed as compared to a maximum pitch speed range associated with the pitcher. As such, if the maximum pitch speed range for the pitcher is between 70 miles per hour (mph) and 100 mph, and the actual maximum pitch speed is 85 mph, the normalized representation can be 0.5. Another calculated input can be a velocity percentage of the pitch, which can be calculated as (initial pitch speed−minimum pitch speed)/(maximum pitch speed−minimum pitch speed). Similarly, any of the other pitch information, pitcher information, stadium information, weather information, etc. may be manipulated to obtain the inputs.

Each of nodes $A_1$, $A_2$, and $A_3$ can include an activation function that is specific to the input corresponding to the node. For example, if input A is the ball movement value of the pitch, the activation function of node $A_1$ can be specifically configured to manipulate the ball movement value. In an illustrative embodiment, the activation functions can be linear functions that are used to normalize the inputs based on established minimum and maximum values of the input. As an example, if the input is maximum pitch speed, an established minimum for the maximum pitch speed may be 50 miles/hour (mph) and an established maximum for the maximum pitch speed may be 110 mph. If the pitch information indicates that the maximum pitch speed was 90 mph, the activation function corresponding to maximum pitch speed input can normalize the actual maximum pitch speed to approximately 0.667 based on the activation function (actual maximum pitch speed−the established minimum for the maximum pitch speed)/(the established maximum for the maximum pitch speed−the established minimum for the maximum pitch speed). Alternatively, any other values may be used. Activation functions having different established values can be applied to each of the other inputs to neural network 300 such that the inputs are all normalized. The activation function may also be a step function for certain inputs. For example, if the input indicates that the pitcher is right-handed the step function can output a first value and if the input indicates that the pitcher is left-handed, the step function can output a second value. Alternatively, any other types of activation functions may be applied to the inputs.

Outputs (i.e., normalized values of the inputs) from input layer 305 of neural network 300 can be weighted and provided to one or more nodes of hidden layer 310. Hidden layer 310 includes nodes $B_1$ and $B_2$. In alternative embodiments, fewer or additional nodes may be included. As an example, an output from node $A_1$ can be weighted with a first weight and provided to node $B_1$, and weighted with a second weight and provided to node $B_2$. The first weight and the second weight can be the same or different, depending on the embodiment. In an illustrative embodiment, the weight can be a value (negative or positive) by which the output is multiplied. As an example, the first weight may be −9.45 and the second weight may be −1.93. Alternatively, any other values may be used. Each output from input layer 305 can be provided to all of the nodes in hidden layer 310 or to only a subset of the nodes in hidden layer 310. Node $B_1$ can sum the inputs that it receives and apply an activation function to the result. In an illustrative embodiment, the activation function can be a sigmoidal or asymptotic function that approaches zero and one at its respective ends. Alternatively, any other type of activation function can be used. Node $B_2$ and any other nodes in hidden layer 310 can similarly sum their inputs and apply their respective activation functions.

In an illustrative embodiment, the activation function(s) can be selected prior to training the neural network. The activation function(s) for the input layer can be normalization functions. The activation function(s) for hidden layers can be sigmoidal functions that take the form of 1/(1+e^(−y)), where y is the input to a node in a hidden layer of the neural network. The activation function(s) can also be a modified sigmoid such as 1/(1+e^(−k*y)) where k is a positive constant (i.e., k affects the steepness of the threshold). In alternative embodiments, a hyperbolic tangent function or any other suitable function known to those of skill in the art can be used as the activation function(s) for the neural network.

Outputs of nodes $B_1$, $B_2$, etc. can be weighted and provided to one or more nodes of output layer 315, which includes nodes $C_1$, $C_2$, and $C_3$. Alternatively, output layer 315 may include fewer or additional nodes. In an illustrative embodiment, the weight can be a value (negative or positive) by which the output is multiplied. As an example, the output from node $B_1$ can be weighted with a first weight and provided to node $C_1$, weighted with a second weight and provided to node $C_2$, and weighted with a third weight and provided to node $C_3$. Any of the first, second, and third weights may be the same as or different from one another. In an alternative embodiment, the output from node $B_1$ may only be provided to a subset of nodes in output layer 315. The output from node $B_2$ can similarly be weighted with one or more weights and provided to one or more nodes of output layer 315.

Each of nodes $C_1$, $C_2$, and $C_3$ can sum their respective inputs and apply an activation function to the summed value to obtain outputs A, B, and C. The activation function can be a linear function, an asymptotic function, etc. Alternatively, any or all of nodes $C_1$, C2, and $C_3$ may not apply an activation function to their respective summed inputs. Outputs A, B, and C can be the pitch classification outputs described with reference to FIG. 1. In an illustrative embodiment, each of outputs A, B, and C are numerical values that indicate a likelihood that the pitch was a particular kind of pitch. For example, output A may correspond to a two-seam fastball, output B may correspond to a four-seam fastball, output C may correspond to a cutter, an output D (not shown) may correspond to a splitter, an output E (not shown) may correspond to a gyro pitch, and so on. In one embodiment, post-processing of the outputs can be performed (as described with reference to FIG. 1) based on the pitcher information, the weather information, the stadium information, and/or any other information that was not considered as an input. Alternatively, any of the pitcher information, the weather information, and/or the stadium information may be provided as inputs to neural network 300.

In an illustrative embodiment, the weights and/or activation functions used by neural network 300 are determined by training neural network 300. Neural network 300 can be trained using any method(s) known to those of skill in the art. In one embodiment, neural network 300 can be trained using backward propagation. In such an embodiment, layers of neural network 300 can be established and initial values of the weights can be randomized. Training data corresponding to a known type of pitch can be fed through neural network 300 as inputs, where the training data can include any of the pitch information, the pitcher information, the weather information, the stadium information, etc. Neural network 300 can generate pitch classification outputs using the randomized weights, and the generated pitch classification outputs can be compared to expected pitch classification outputs. The expected pitch classification outputs can be based on expert analysis of the pitch. Based on the comparison, an error coefficient can be determined for each node in neural network 300. The weights can be adjusted based on one or more of the error coefficient of the outbound node that is to receive the weighted data, a learning rate, a momentum rate, etc. The process can be repeated with additional training data until neural network 300 is able to accurately classify pitches. Alternatively, any other training method known to those of skill in the art may be used.

In one embodiment, a single neural network or pitch classification algorithm can be used to classify all pitches from all pitchers. Alternatively, a plurality of neural networks or pitch classification algorithms may be used. For example, a first neural network may be used to classify pitches from right-handed pitchers and a second neural network may be used to classify pitches from left-handed pitchers. Similarly, a first neural network may be used to classify pitches from a first group of pitchers that have a first pitch repertoire (i.e., the first group generally throws similar types of pitches), a second neural network may be used to classify pitches from a second group of pitchers that have a second pitch repertoire, and so on. In one embodiment, a dedicated neural network can be developed for each pitcher in a league to improve overall accuracy.

In an illustrative embodiment, the neural network used to classify pitches has an input layer, two hidden layers (with 34 nodes in each hidden layer), and an output layer. Alternatively, other numbers of hidden layers and/or nodes may be used. As a numerical example, inputs to the real time pitch classification system can be an initial pitch speed of 89.5 miles per hour (mph), a ball movement value of 7.42 inches, an acceleration (in the x direction) of −4.795, and a right-handed pitcher. The inputs are entered into an input layer. The input layer linearly normalizes the initial pitch speed to 0.67, the ball movement value to 0.42, and the acceleration to 0.23. The right-handed pitcher input is applied to a step function of 1.0 (a step function of 0 is used if the pitcher is left-handed). Weights between the input layer and a first node of a first hidden layer are (−12.24, 0.46, 6.11, and 6.07). Respectively applying these weights to the outputs of the input layer results in {0.67*−12.24=−8.20, 0.42*0.46=0.19, 0.23*6.11=1.41, 1.0*6.07=6.07}. The sum of the weighted values (i.e., the input to the first node of the first hidden layer) is −0.53. Weights between the input layer and a second node of the first hidden layer are (9.12, −2.16, 2.11, and −3.9). Respectively applying these weights to the outputs of the input layer results in {0.67*9.12=6.11, 0.42*−2.16=−0.91, 0.23*2.11=0.49, 1.0*−3.9=−3.9}. The sum of the weighted values (i.e., the input to the second node of the first hidden layer) is 1.79.

The first node of the first hidden layer applies the sigmoid function (1/(1+e^(−y)) to its input, resulting in (1/(1+e^(−(−0.53))=0.37. The second node of the first hidden layer also applies the sigmoid function (1/(1+e^(−y)) to its input, resulting in 1/(1+e^(−1.79)=0.86. This process is repeated (using corresponding weights associated with each node) to obtain inputs for each of the other 32 nodes in the first hidden layer. The process is also repeated to obtain inputs for the 34 nodes in the second hidden layer and to obtain inputs to the output layer (based on the outputs from the second hidden layer). Activation functions are applied to the inputs of the output layer to obtain an output value for each output node. An output value for a first output node (corresponding to a 4-seam fastball) is 0.72, an output value for a second output node (corresponding to a 2-seam fastball) is 0.81, an output value for a third output node (corresponding to a changeup) is 0.6, an output value for a fourth output node (corresponding to a slider) is 0.37, and an output value for a fifth output node (corresponding to a knuckleball) is 0.21. In alternative embodiments, additional output nodes can be used, and the additional output nodes can correspond to additional pitch types.

Continuing the example, the pitch would be classified as a 2-seam fastball (i.e., the highest value) based solely on the outputs of the output layer. However, post processing of the outputs is used to increase the accuracy of the system. Pitcher information indicates that the pitcher often throws 4-seam fastballs, changeups, sliders, that he/she occasionally throws 2-seam fastballs, and that he/she never throws knuckleballs. As such, a weight of 1.5 is applied to the common pitches of the pitcher, a weight of 0 is applied to the pitches that he/she never throws, and a weight of 1 (i.e., no weight) is applied to the pitches that he/she occasionally throws. The result of the weighting is as follows: 0.72 (4-seam)*1.5=1.08, 0.81 (2-seam)*1.0=0.81, 0.6 (changeup)*1.5=0.90, 0.37 (slider)*1.5=0.56, and 0.21 (knuckleball)*0=0. Based on the repertoire of the pitcher, the pitch is classified as a 4-seam fastball.

Additional post processing may also be performed on the weighted values and the pitcher information. For example, the pitcher information may indicate that an average initial speed of fastballs thrown by the pitcher is 97.5 mph. The system can determine that the initial speed of the present pitch is not close enough to the average initial speed of the pitcher to be considered a fastball for that pitcher. As such, the system classifies the pitch as a changeup. The range for determining if the pitch is close enough to the average can be within 5% of the average, within 6% of the average, within 7% of the average, etc. depending on the embodiment. The system can also classify the pitch based on the preferences of the pitcher. For example, the system may consider a 2-seam fastball to be the same type of pitch as a sinker. If the system determines that the pitch is a 2-seam fastball and the pitcher information indicates that the pitcher would classify a 2 seam fastball (as determined by the system) as a sinker, then the pitch may be classified as a sinker.

Figure 4:
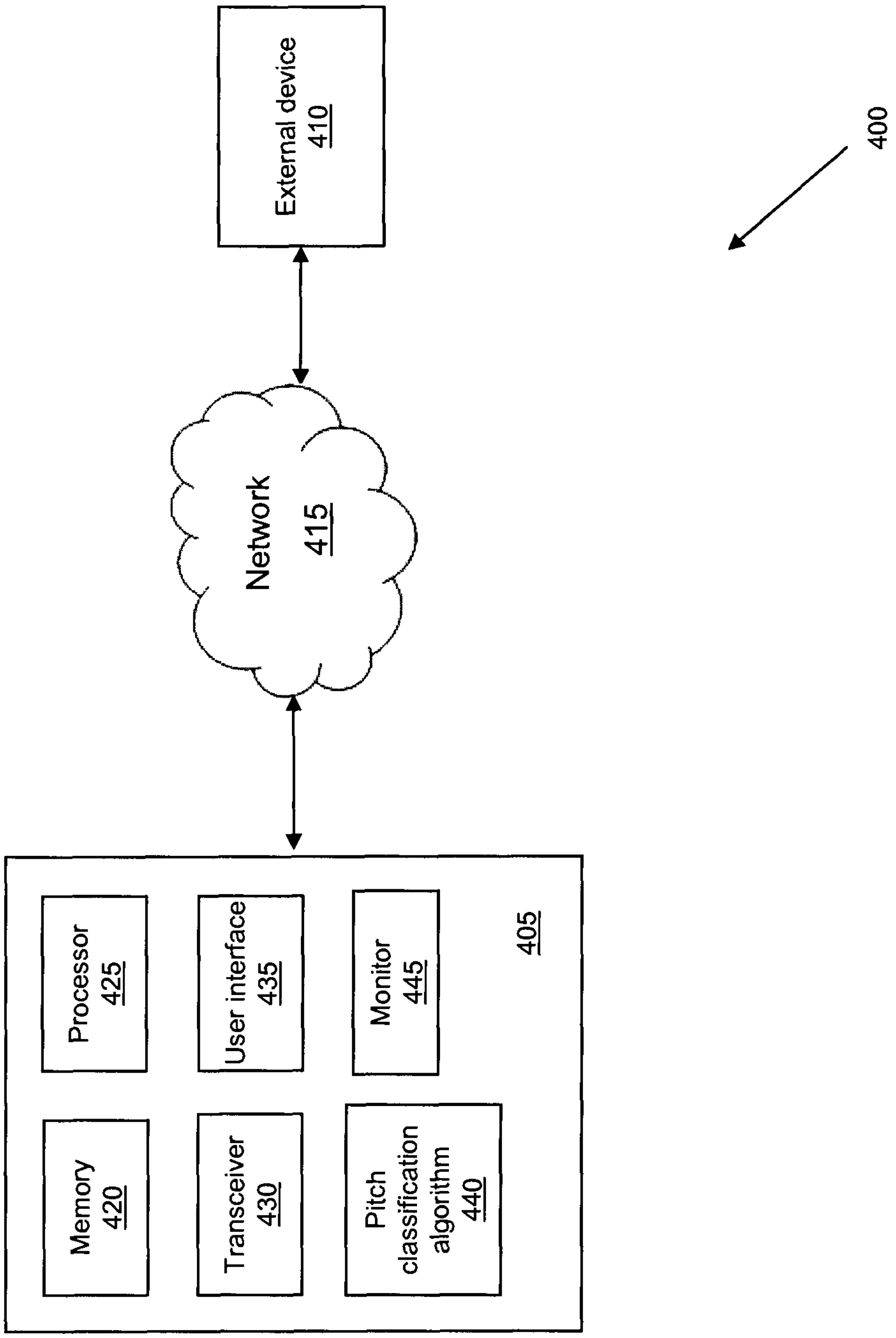
FIG. 4 is a block diagram illustrating a real time pitch classification system in accordance with an illustrative embodiment.

FIG. 4 is a block diagram illustrating a real time pitch classification system 400 in accordance with an illustrative embodiment. Real time pitch classification system 400 includes a computing device 405 and an external device 410. In an illustrative embodiment, computing device 405 can be used to perform pitch classification. External device 410 can receive pitch classification data from computing device 405. External device 410 can be a server configured to present the pitch classification as part of a play-by-play analysis on a website. Alternatively, external device 410 can be a personal computer, a database, a personal digital assistant, a cellular phone, and/or any other type of computing device. Computing device 405 and external device 410 can exchange information over a network 415. Network 415 can be a wide area network such as the Internet, a local area network, a wired or wireless telecommunications network, and/or any other data communication network known to those of skill in the art.

Computing device 405 can be any type of computing device known to those of skill in the art. Computing device 405 includes a memory 420, a processor 425, a transceiver 430, a user interface 435, a pitch classification algorithm 440, and a monitor 445. In alternative embodiments, computing device 405 may include fewer, additional, and/or different components. Each of the components of computing device 405 can be operatively coupled to one another according to any methods known to those of skill in the art.

Memory 420 can be any type of tangible computer-readable medium, and can be used to store stadium information, pitch information, pitcher information, etc. Memory 420 can also be used to store pitch classification algorithm 440 and/or any other algorithms used by pitch classification system 400. Processor 425 can be configured to execute computer-readable instructions corresponding to pitch classification algorithm 440. Processor 425 can also be configured to communicate with and/or control any other components of computing device 405.

Transceiver 430 can be used to receive and/or transmit information through network 415. As an example, transceiver 430 can receive any of the pitcher information, the weather information, and/or the stadium information. In an embodiment in which monitor 445 is remotely located or controlled by another entity, transceiver 430 can also receive the pitch information. In an illustrative embodiment, transceiver 430 can also communicate with external device 410 to provide pitch classification information, game information, etc. In another illustrative embodiment, transceiver 430 can be an internal or external modem. Transceiver 430 may also be any other receiving component and/or transmitting component known to those of skill in the art. User interface 435 can include a computer mouse, a keyboard, a display, a touch screen, a touch pad, and/or any other component that allows a user to interact with computing device 405. The user can interact with computing device 405 to manually enter any of the pitch information, the pitcher information, the weather information, the stadium information, etc.

Pitch classification algorithm 440 can be configured to perform any of the operations described herein to classify pitches. In an illustrative embodiment, pitch classification algorithm 440 can be implemented as a neural network. Alternatively, any other type of algorithm may be used. Monitor 445 can include one or more video cameras, one or more acceleration sensors, one or more speed sensors, one or more elevation sensors, and/or any other components configured to monitor a pitch. Monitor 445 may also use radar as known to those of skill in the art to monitor the pitch. Monitor 445 can also include one or more algorithms to analyze video of the pitch, sensor readings, etc. to generate the pitch information. The one or more algorithms can be stored in memory 420 and executed by processor 425. In an alternative embodiment, monitor 445 may not be included in computing device 405. In such an embodiment, the pitch information can be received by transceiver 430 of computing device 405 from an external source.

Described herein are methods, systems, and computer readable media for classifying pitches. As compared with traditional pitch classification systems, the embodiments described herein provide more accurate and reliable classification of pitches. At least one reason for the increased accuracy is the use of additional information such as pitcher information, weather information, stadium information, etc. As an example, in one embodiment, a repertoire of pitches thrown by a given pitcher is used to help classify pitches thrown by the given pitcher. The repertoire of pitches can be used to decrease the likelihood that a pitch thrown by the given pitcher is classified as a pitch type that is rarely or never thrown by the given pitcher, thereby increasing the accuracy and reliability of the pitch classification.

The methods, systems, and computer readable media described herein have been described with reference to baseball and pitch classification. However, it is important to understand that the described embodiments are not limited to baseball or to pitch classification. Rather, the embodiments described herein can be used for classification of the movement and/or trajectory of a football, a softball, a tennis ball, a hockey puck, a soccer ball, etc.

One or more flow diagrams have been used herein. The use of flow diagrams is not meant to be limiting with respect to the order of operations performed. The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for classifying a pitch thrown by a human pitcher, the method comprising:

receiving, at a computing device, one or more pitch properties corresponding to a ball physically thrown by the human pitcher, wherein the ball physically thrown by the human pitcher comprises the pitch, and wherein the one or more pitch properties comprise one or more of a breaking distance of the ball, a release speed of the ball, a maximum speed of the ball, a minimum speed of the ball, an average speed of the ball, and a direction of movement of the ball, determined using one or more devices monitoring the ball in flight during the pitch;

receiving, at the computing device, pitcher information corresponding to the human pitcher stored in a memory device, wherein the pitcher information includes at least an identification of a plurality of different pitch types that have previously been determined to be in a repertoire of the human pitcher; and classifying, by the computing device and based at least in part on the one or more pitch properties and the pitcher information, the pitch using a pitch classification algorithm stored in the memory device, the pitch being classified as one of the plurality of different pitch types in the repertoire of the human pitcher having the highest likelihood of matching a trajectory of the pitch.

2. The method of claim 1, further comprising:

receiving an output from the pitch classification algorithm, wherein the output represents a likelihood that the pitch is a particular type of pitch; and biasing the output based at least in part on the identification of the plurality of different pitch types that are in the repertoire of the human pitcher.

3. The method of claim 1, wherein the pitch classification algorithm is implemented as a neural network, and wherein the one or more pitch properties are inputs to the neural network.

4. The method of claim 1, further comprising receiving weather information, wherein the classification of the pitch is based at least in part on the weather information.

5. The method of claim 4, wherein the weather information includes one or more of a wind speed, a wind direction, a temperature, a humidity, an amount of sunlight, or a time of day.

6. The method of claim 1, further comprising providing the classification of the pitch to a game monitoring system.

7. The method of claim 1, wherein the pitcher information further includes one or more of an indication of whether the human pitcher is right-handed or left-handed, a maximum pitch speed of the human pitcher, a minimum pitch speed of the human pitcher, a speed range of the human pitcher, or an identification of one or more pitch types that are not thrown by the human pitcher.

8. The method of claim 1, wherein the plurality of different pitch types include at least two of a breaking ball, a changeup ball, a knuckleball, an eephus pitch, a spitball, or a gyro ball.

9. A computing device comprising:
- a memory configured to store a pitch classification algorithm; and
- a processor operatively coupled to the memory and configured to:
  - provide one or more pitch properties corresponding to a ball physically thrown by a human pitcher to the pitch classification algorithm, wherein the ball physically thrown by the human pitcher comprises a pitch, and wherein the one or more pitch properties comprise one or more of a breaking distance of the ball, a release speed of the ball, a maximum speed of the ball, a minimum speed of the ball, an average speed of the ball, and a direction of movement of the ball, determined using one or more monitoring devices that monitor the ball in flight during the pitch;
  - provide pitcher information to the pitch classification algorithm, wherein the pitcher information includes at least an identification of a plurality of different pitch types that have previously been determined to be in a repertoire of the human pitcher; and
  - classify, based at least in part on the one or more pitch properties and the pitcher information, the pitch using the pitch classification algorithm, the pitch being classified as one of the plurality of different pitch types in the repertoire of the human pitcher having the highest likelihood of matching a trajectory of the pitch.

10. The computing device of claim 9, further comprising a receiver configured to receive the one or more pitch properties from the one or more monitoring devices.

11. The computing device of claim 10, further comprising the one or more monitoring devices, wherein the one or more monitoring devices include a video camera.

12. The computing device of claim 9, wherein the one or more pitch properties include one or more of an initial acceleration of the ball, an ending acceleration of the ball, an average acceleration of the ball, a direction of acceleration of the ball, an amount of spin on the ball, or a direction of the spin on the ball.

13. The computing device of claim 9, wherein the pitcher information further includes an indication of how the human pitcher would classify the pitch based on the pitch information.

14. A non-transitory computer-readable medium having stored thereon, computer-executable instructions that, if executed by a computing device, cause the computing device to perform a method comprising:
- receiving one or more pitch properties corresponding to a ball physically thrown by a human pitcher, wherein the ball physically thrown by the human pitcher comprises a pitch, and wherein the one or more pitch properties comprise one or more of a breaking distance of the ball, a release speed of the ball, a maximum speed of the ball, a minimum speed of the ball, an average speed of the ball, and a direction of movement of the ball, determined using one or more monitoring devices that monitor the ball in flight during the pitch;
- receiving pitcher information corresponding to the human pitcher, wherein the pitcher information includes at least an identification of a plurality of different pitch types that have been previously determined to be in a repertoire of the human pitcher; and
- classifying, based at least in part on the one or more pitch properties and the pitcher information, the pitch, the pitch being classified as one of the plurality of different pitch types in the repertoire of the human pitcher having the highest likelihood of matching a trajectory of the pitch.

15. The non-transitory computer-readable medium of claim 14, further comprising providing the classification of the pitch to a game monitoring system.

16. The non-transitory computer-readable medium of claim 14, further comprising receiving weather information, wherein the classification of the pitch is based at least in part on the weather information, and wherein the weather information includes a wind speed and a wind direction.

17. The non-transitory computer-readable medium of claim 14, further comprising:
- determining an output that represents a likelihood that the pitch is a particular type of pitch; and
- biasing the output based at least in part on the identification of the plurality of different pitch types that are in the repertoire of the human pitcher.

* * * * *